United States Patent [19]

Lyon

[11] 4,000,673
[45] Jan. 4, 1977

[54] PUNCHING MACHINE

[75] Inventor: John W. Lyon, Hot Springs, Ark.

[73] Assignee: Nineteen Sixties Corporation, Hot Springs, Ark.

[22] Filed: June 21, 1972

[21] Appl. No.: 264,834

[52] U.S. Cl. ................................ 83/526; 83/571; 83/620; 83/633
[51] Int. Cl.² ........................................ B26F 1/06
[58] Field of Search ................................. 83/524–526, 83/620, 633, 571, 573; 74/45; 100/293

[56] References Cited
UNITED STATES PATENTS

| 858,066 | 6/1907 | Fehr | 83/633 X |
|---|---|---|---|
| 1,159,161 | 11/1915 | Bernhagen | 83/633 X |
| 1,920,999 | 8/1933 | Murch | 83/620 X |
| 2,630,467 | 3/1953 | Winther | 83/526 X |
| 3,072,003 | 1/1963 | Sirugue | 83/524 X |
| 3,153,966 | 10/1964 | Fredrick et al. | 83/571 |
| 3,416,392 | 12/1968 | Rutz | 83/526 X |
| 3,592,092 | 7/1971 | Blowsky | 83/524 X |

Primary Examiner—J. M. Meister
Attorney, Agent, or Firm—John R. Walker, III

[57] ABSTRACT

A machine for punching a series of aligned holes in suitable stock, e.g., for forming binding holes in a stack of sheet material such as paper. The machine is electrically operated and generally includes a pressure bar which is guidingly constrained for movement along a vertical plane. A plurality of punches and coating dies are included and are arranged in a row and suitably attached to base structure directly beneath the pressure bar. Downward movement of the pressure bar is effective to drive the lower portions of selected ones of the punches into the respective dies and upward movement of the pressure bar is effective to return those driven punches, thus constituting one cycle thereof. A pair of lever arms are provided, having one of the ends thereof coupled to the pressure bar and being pivotally attached to the base and are suitably power driven by structure including a clutch which is operably coupled to the other ends of the lever arms for causing reciprocating movement thereof. Also included is switching structure for selectively causing the clutch to be engaged to drive the punches through the described cycle.

15 Claims, 7 Drawing Figures

PUNCHING MACHINE

BACKGROUND OF THE INVENTION

1. Field of the Invention

This invention relates to punching machines for punching a series of aligned holes in suitable stock.

2. Description of the Prior Art

A preliminary patentability search revealed the following U.S. patents: Mentzer et al. U.S. Pat. No. 2,985,052; Frederick et al. U.S. Pat. No. 3,153,966; Friedland et al. U.S. Pat. No. 3,174,378, and Staats et al. U.S. Pat. No. 3,427,914. None of the above references show or suggest applicant's gang punch construction.

SUMMARY OF THE INVENTION

The concept of the present invention is to provide a machine for punching a series of aligned holes in suitable stock, e.g., for forming binding holes in a stack of sheet material such as paper. The machine is electrically operated and generally includes a pressure bar guidingly constrained for movement thereof along a vertical plane, a plurality of punches and coacting dies arranged in a row and attached to the base structure directly beneath the pressure bar. Downward movement of the pressure bar is effective to drive the lower portions of selected ones of the punches into the respective dies and upward movement of the pressure bar is effective to return those driven punches, thus constituting one cycle thereof. A pair of lever arms are provided having one of the ends thereof coupled to the pressure bar and being pivotally attached to the base, and are suitably power driven by structure including a clutch which is operably coupled to the other ends of the lever arms for causing reciprocating movement thereof. Also included is switching structure for selectively causing the clutch to be engaged to drive the punches through the described cycle.

A feature of the present invention is the peculiar structure coupling the lever arms to the pressure bar. Other features of the invention include a massive flywheel for temporarily storing the kinetic energy from an electric motor and an electromagnetic clutch which is effectively engaged for subsequent instantaneous dissipation of the kinetic energy from the flywheel. Further, an electromagnetic brake is included for stopping the punches at a precise position and holding them stationary until the machine is cycled again. Further, electronic switching means are included for selectively causing the electromagnetic clutch and the electromagnetic brake to be energized and/or de-energized. Further, electric means are included for controlling the time in which the clutch and brake are engaged, i.e., the switching means being responsive to the electric means. Other features of the gang punch machine of the invention will be disclosed later in the specification.

DESCRIPTION OF THE PREFERRED EMBODIMENT

The punching machine or gang punch 11 of the present invention is intended for punching a series of aligned holes in suitable stock, e.g., for forming binding holes in a stack of sheet material such as paper. From FIG. 1 of the drawings, it may be seen that the gang punch 11 includes the usual adjustable guide 13 which may be locked to infinite positions along a slot 15 to act as a guide for the side edges of the stock or a stack of sheet material such as paper.

Figure 7:
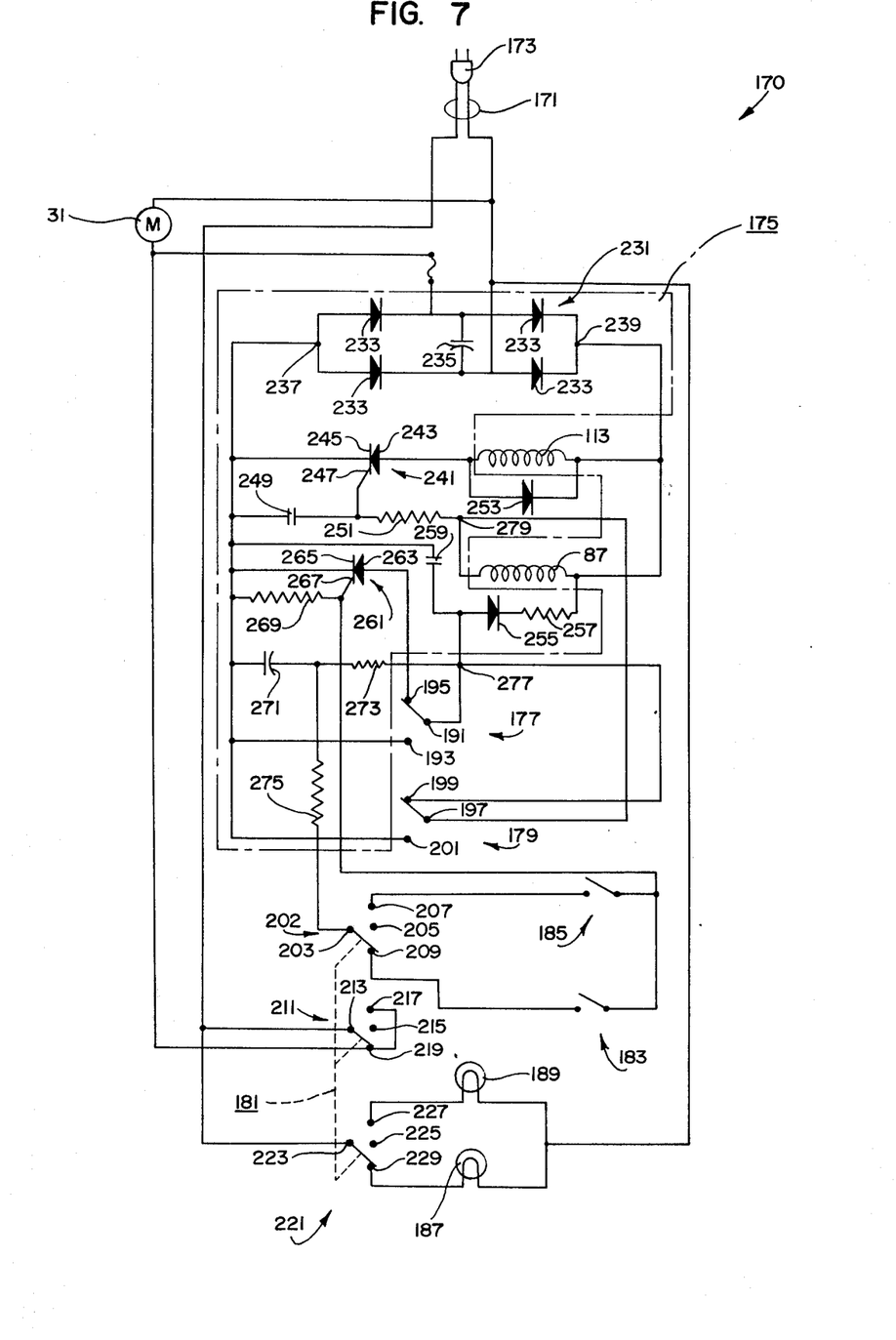
FIG. 7 is a schematic of the electrical structure included in the machine of the present invention.

The punch 11 generally includes a base 17, cabinet structure 18, a pressure bar 19 guidingly constrained for movement thereof along a vertical plane, a plurality of punches 21 and coating dies 23 arranged in a row and suitably attached to the base 17 as with a punch block 25, a pair of lever arms 27, 29 and switching structure as depicted in FIG. 7 of the drawings. One of the ends of the respective lever arms 27, 29 are coupled to the pressure bar 19 and, being pivotally attached intermediate thereof to the base 17, are driven by a motor 31 through suitable drive structure including an electromagnetic clutch 33. The motor 31 is operably coupled to the other ends of the lever arms 27, 29 for causing reciprocating movement thereof. The switching structure alluded to above is for selectively causing the clutch 33 to be engaged to drive the punches 21 and to energise other structure yet to be described.

Figures 3, 4:
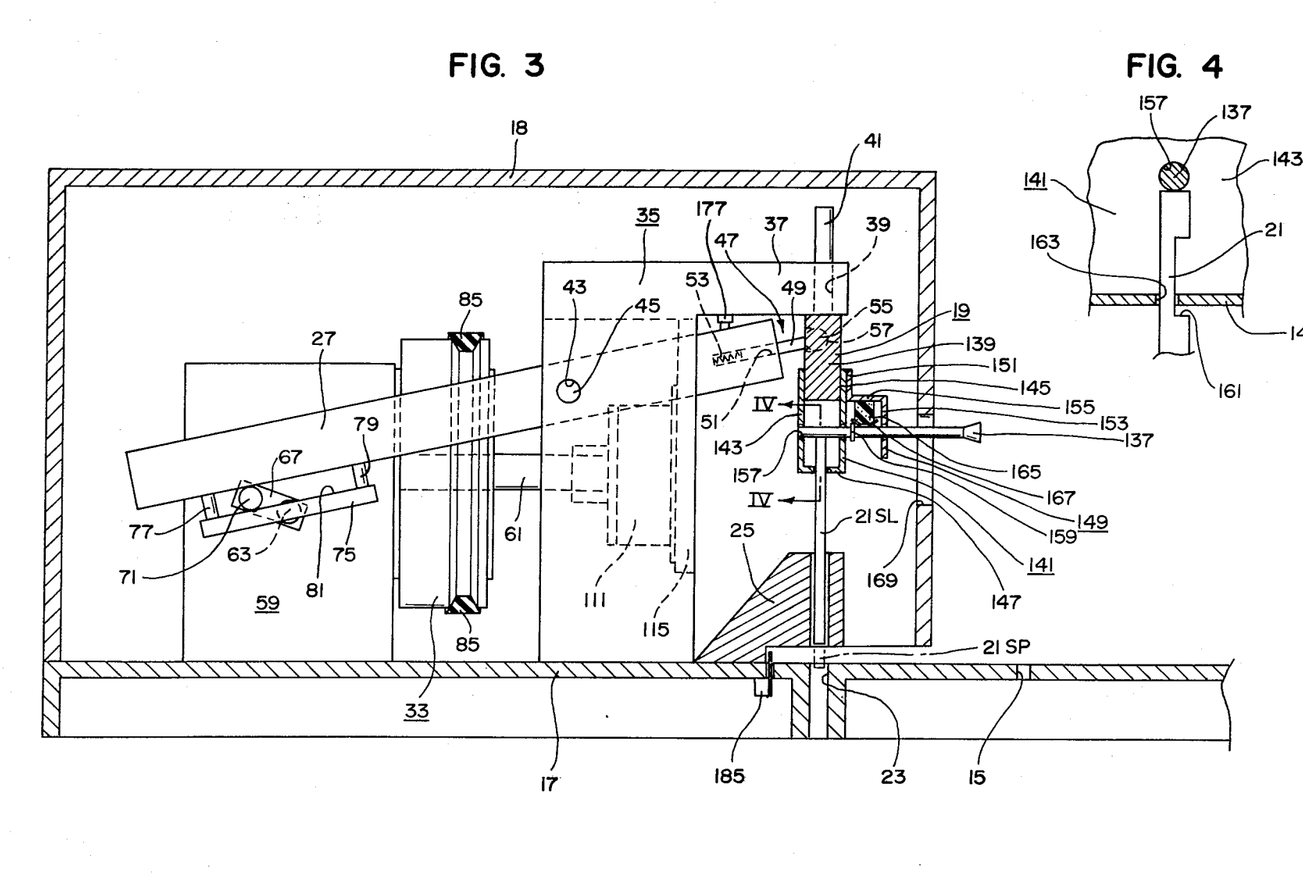
FIG. 3 is a sectional view taken as on the line III—III of FIG. 2.
FIG. 4 is an enlarged partial sectional view taken as on the line IV—IV of FIG. 3.

More specifically, from FIG. 3 of the drawings it may be seen that the punch 11 includes a pair of main support members 35 which are arranged in an upstanding manner and have the lower edges thereof fixedly attached to the base 17 in any well known manner, as by welding, bolts, or the like. Base support members 35 include outwardly directed arm portions 37 which individually are provided with a vertically aligned aperture 39. The pressure bar 19 is slidably attached to the arm portions 37, i.e., a pair of pins 41 have the lower ends thereof fixedly attached to the pressure bar 19 and extend upwardly therefrom through the apertures 39. In other words, the pressure bar 19 is guidingly constrained for movement along a vertical plane.

The lever arms 27, 29 are pivotally attached to the support members 35, i.e., each of the support members 35 are provided with an aperture 43 for receiving a pivot pin 45. In other words, the lever arm 27, 29 may freely be pivoted about the pivot pins 45, thus the outer ends thereof establish a circular generatrix. However, I have found that arcuate travel of the pressure bar 19 does not provide evenly distributed pressure on the punches 21. Obviously, a force generated in any direction on the punches 21 other than along the longitudinal axes thereof would tend to bend or break the punches 21.

Therefore, a feature of the present invention is the peculiar coupling means 47 depicted in FIG. 3 for driving the pressure bar 19 by the lever arms 27, 29. The coupling means 47 includes a pair of shafts 49 (only one is shown). The outer ends of the lever arms 27, 29 are provided with a bore 51 for respectively slidably receiving the shafts 49, i.e., the bores 51 extending substantially parallel with the longitudinal axes of the arms 27, 29 with the shafts 49 protruding outwardly from the outer ends of the arms 27, 29 toward the pressure bar 19. The coupling means 47 also includes a pair of compression springs 53 which are received in the bores 51 ahead of the shafts 49 for respectively urging the shafts 49 toward the pressure bar 19. Each of the shafts 49 includes a ball portion 55 attached to the protruding ends thereof. The ball portion 55 may be formed from steel or the like, however, I prefer that it be formed from "Teflon" plastic. Additionally, the pressure bar 19 is provided with a pair of sockets 57 (only one is shown) for respectively receiving the balls 55. Therefore, even though the pressure bar 19 is constrained for movement in a vertical plane tangent to the generatrix of the arms 27, 29, the shafts 49 move in and out of their respective bores 51 as the distance between the ends of the lever arms 27, 29 and the pressure bar changes, thus providing a simple yet durable and reliable coupling means 47.

Figure 2:
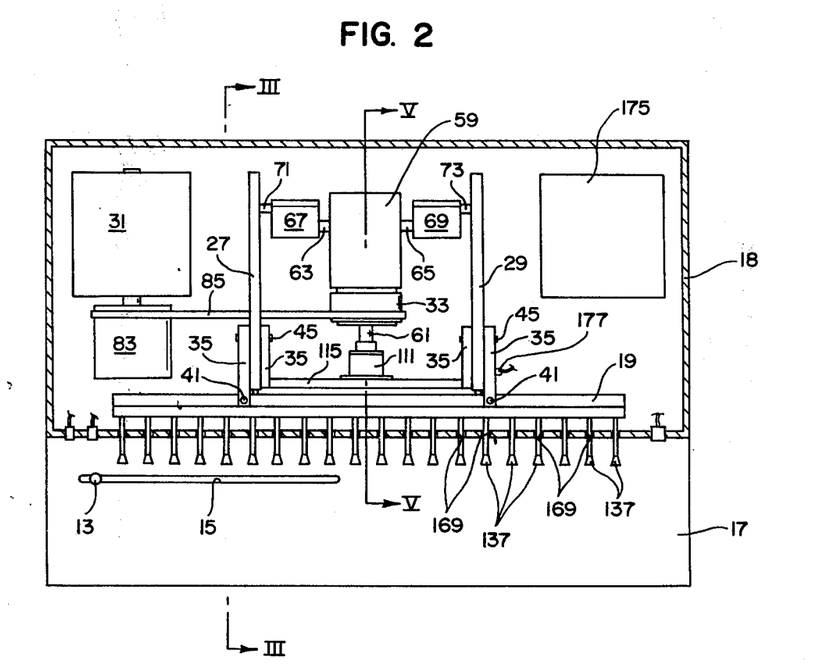
FIG. 2 is a sectional view taken as on the line II—II of FIG. 1.

The punch 11 preferably is powered by the electric motor 31 having suitable specifications, e.g., 115 volts AC, ⅛ horsepower, and rotating at approximately 1,700 rpm. The punch 11 preferably includes a gear reduction system 59 having a 10:1 gear ratio. The gear reduction system 59, of suitable well known construction, has a rotatable input shaft 61 and a pair of rotatably driven output shafts 63, 65 as shown in FIG. 2 of the drawings. The output shafts 63, 65 respectively are attached to pitman drive blocks 67, 69, i.e., the drive blocks 67, 69 drive cam follower rollers 71, 73 which change the rotary motion of the output shafts 63, 65 to reciprocating motion to drive the lever arms 27, 29 up and down.

Each of the lever arms 27, 29 includes a drive bar 75 (FIG. 3) which is attached thereto by a pair of spacers 77, 79 to establish a slot 81 for receiving the cam follower rollers 71, 73.

The punches 21 have stock loading 21 SL and stock piercing 21 SP positions thereto which may clearly be seen from FIG. 3 of the drawings. in other words, downward movement of the pressure bar 19 is effective to drive the lower portions of selected ones of the punches 21 into their respective dies 23 to constitute the stock piercing 21 SP position. Conversely, upward movement of the pressure bar 19 is effective to carry those selected ones of the punches 21 to the position depicted in FIG. 3 of the drawings, thus constituting the stock loading 21 SL position. One complete cycle of the punches 21 or the machine 11 involves movement of the punches from the stock loading 21 SL position to the stock piercing 21 SP position and back to the stock loading 21 SL position. Certain structure of the present invention yet to be disclosed depends on determining precisely the time frame for a cycle of the punch 11. Therefore, I have selected 0.55 seconds as a suitable time frame, however, it will be appreciated by those skilled in the art that other time frames for a cycle may equally be effective and determined by changing certain dimensions and values for certain structure yet to be disclosed.

The punch 11 includes a flywheel 83 which is rotatably driven by the motor 31. The flywheel 83 temporarily stores the kinetic energy from the motor 31 for subsequent instantaneous dissipation thereof. I have found that constructing the flywheel 83 so as to have approximately 12 pounds of mass thereto is an optimum arrangement for the purpose herein intended.

An endless belt 85 couples the flywheel 83 to the clutch 33. More specifically, the clutch 33 preferably is a suitable electromagnetic type and includes an electromagnetic coil 87 which is fixedly attached to housing structure 89 of the gear reducer 59 by a plurality of bolts 91, as clearly shown in FIG. 5 of the drawings. The clutch 33 also includes a pulley member 93, a circular armature plate member 95, and a hub member 97. The hub member 97 is keyed to the shaft 61 by a key member 99 and the armature plate member 95 is attached to the hub member 97 by a plurality of leaf springs 101, i.e., one of the ends of the respective leaf springs 101 being attached to the hub member 97 as with rivets 103 and the other ends of the respective springs 101 being attached to the armature plate member 95 as with rivets 105. The pulley member 93 is journaled to the hub member 97 by a bearing assembly 107 shown diagrammatically in FIG. 5. Additionally, the shaft 61 is journaled to the housing structure 89 by a bearing assembly 109, also shown diagrammatically.

I prefer that the pulley member 93 be slightly larger in diameter than the flywheel 83, e.g., the portion of the pulley member 93 which receives the endless belt 85 being approximately 5 inches in diameter and the portion of the pulley 83 which receives the endless belt 85 being approximately 4⅜ inches in diameter. Therefore, the time frame alluded to above for one cycle of the punch machine remains fixed at 0.55 seconds. If should now be apparent to those skilled in the art that operating the motor 31 causes the flywheel 83 to rotate which rotatably drives the pulley member 93 by the endless belt 85, i. e., the pulley member 93 being allowed to rotate about the hub member 97 by the bearing assembly 107. Accordingly, the shaft 61 remains stationary until the electromagnetic coil 87 is energized. Energizing the coil 87 pulls the armature plate member 95 inwardly so as to contiguously engage the pulley member 93, i.e., flexing the springs 101. Accordingly, the shaft 61 begins to rotate, i.e., the pulley member 93 rotatably drives the armature plate member 95 which drives the hub member 97 through the leaf springs 101.

Figure 5:
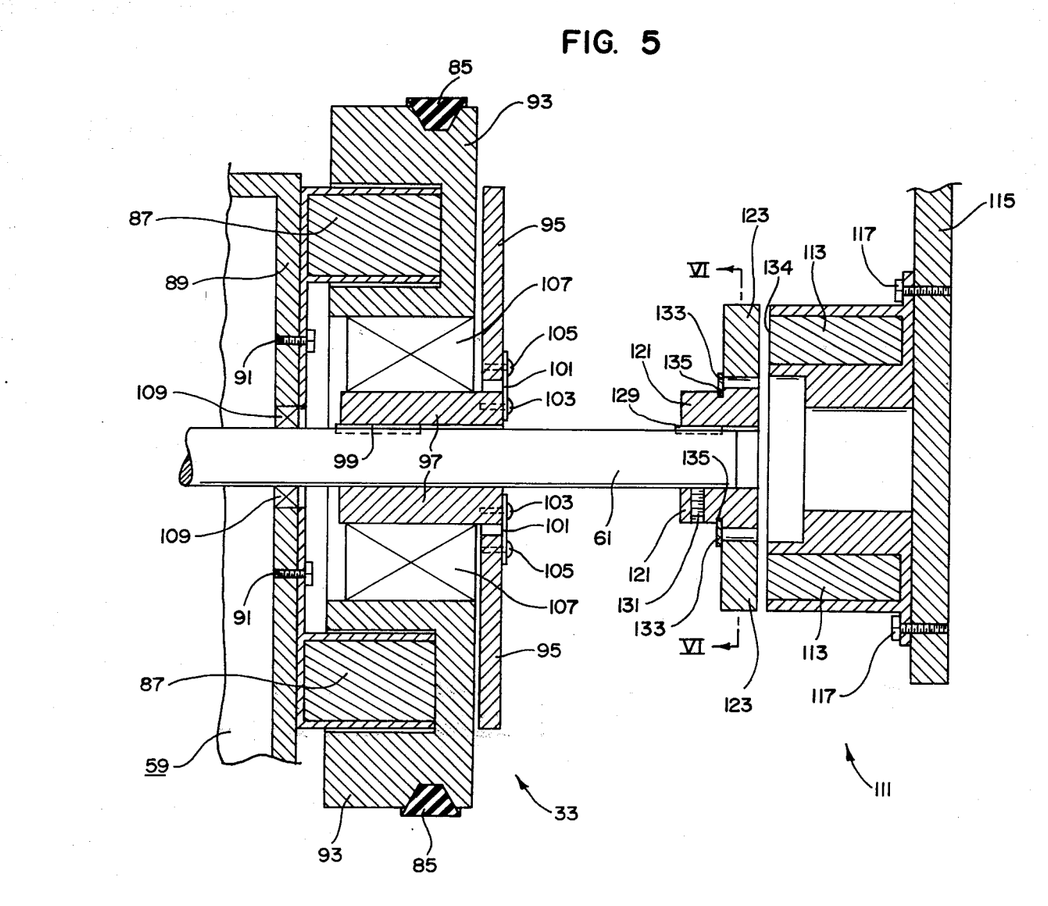
FIG. 5 is an enlarged partial sectional view taken as on the line V—V of FIG. 2 and showing certain parts diagrammatically.

It will be appreciated that de-energizing the electromagnetic coil 87 will eventually allow the shaft 61 to stop rotating. However, inertia will cause the shaft 61 to rotate for awhile. Thus, were it not for the means, to be described hereinafter, the pressure bar 19 would stop at the position depicted in FIG. 3 of the drawings, i.e., with punches 21 being in the stock loading 21 SL position. Therefore, means are included for selectively stopping the punches 21 in the stock loading 21 SL position and/or for selectively precluding inadvertent movement thereof from the stock loading 21 SL position. Accordingly, the machine 11 includes an electromagnetic brake assembly 111 for this purpose which is best shown in FIG. 5 of the drawings. The electromagnetic brake assembly 111 includes an electromagnetic coil 113 fixedly attached to a stationary plate 115 by a plurality of bolts 117. From FIGS. 2, 3 of the drawings, it may be seen that the main support members 35 have upper center portions thereof notched out to receive the arms 27, 29, i.e., each pivot pin 45 extending through two portions of a support member 35 (an inner portion and an outer portion). Accordingly, the stationary plate 115 extends between the inner portions of the main support members 35 and is fixedly attached thereto as by welding or the like.

Figure 6:
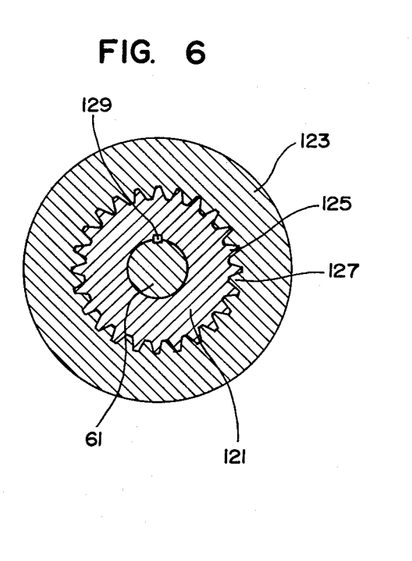
FIG. 6 is a sectional view taken as on the line VI—VI of FIG. 5.

The brake assembly 111 includes a hub member 121 and an armature plate member 123. From FIG. 6 of the drawings, it may be seen that the outer periphery of the hub member 121 constitutes external spline gear structure 125 and the armature plate member 123 has a concentric opening therein defined by internal spline gear teeth 127 for constant meshing with the external spline gears 125. The hub member 121 is keyed to the shaft 61 by a key 129 and a set screw 131 is jammed against the shaft 61 to prevent axial movement of the hub member 121. The armature plate 123 is free to slide axially to and fro, being limited in its movement by a snap-ring 133 and the face structure 134 of the electromagnetic coil 113. The snap-ring 133 is received in an annular groove 135. More specifically, the axial sliding motion of the armature plate 123 is between the external and internal gear structure 125, 127.

Therefore, when the magnetic clutch assembly 111 is de-energized, the shaft 61 is free to rotate. On the other hand, energizing the electromagnetic coil 113 pulls the armature plate 123 contiguously against the face of the electromagnetic coil 113 which, in effect, locks the shaft 61 to the stationary plate 115. Obviously, the shaft 61 does not stop instantaneously by energizing the electromagnetic coil 113. However, the degrees of rotation can readily be determined. Therefore, energizing the electromagnetic coil 113 precisely at a predetermined number of degrees of travel prior to the pressure bar 19 reaching the position depicted in FIG. 3 will reliably assure that the punches 21 come to rest precisely at the stock loading 21 SL position previously described. A means for accomplishing the above purpose is included in the gang punch 11 and will be fully disclosed later in the specification.

The gang punch 11 also includes a plurality of disengaging pins 137 (FIGS. 1, 2 and 3) for selectively engaging and disengaging any number of the punches 21. In other words, a disengaging pin 137 is provided for each punch 21, there being any desirable number in all. The disengaging pins 137 respectively have a punch engage position and a punch disengage position and are slidably attached to the pressure bar 19 as best depicted in FIG. 3 of the drawings in a manner yet to be disclosed.

The pressure bar 19 includes an upper bar member 139 (FIG. 3) and a lower channel member 141 having a pair of opposing flanges 143, 145 fixedly attached one to the other by a web 147. The bar member 139 is received in the channel member 141 and is fixedly attached thereto in any well known manner, as by bolts (not shown) or the like. An elongated offset member 149 is included having an upwardly directed flange 151 and a downwardly directed flange 153 integrally joined one to the other by a web 155. The upwardly directed flange 151 contiguously engages a portion of the flange 145 and is fixedly attached thereto as by bolts (not shown) or the like. Each of the flanges 143, 145, and 153 is provided an aligned aperture as shown by the aperture 157 in the flange 143, i.e., the three apertures 157 being in alignment for slidably receiving the disengage pin 137. Each of the disengage pins 137 includes an enlarged ridge portion 159 which serves at least two functions. The first function for the ridge 159 is that it acts as a stop when engaging the flange 153 when moved to the punch disengage position, i.e., the ridge 159 being larger in diameter than is the aperture 157 in the flange 143. The other purpose alluded to will be apparent from the remaining disclosure.

It should be understood that when the disengage pin 137 is in the punch engaged position, as shown in FIG. 3 of the drawings, downward movement of the pressure bar 19 causes the disengage pin 137 to engage the upper end of the punch 21 causing it to be driven downwardly. Conversely, pulling outwardly on the pin 137 or to the right, as viewed in FIG. 3, causes it to move to the punch disengage position which displaces the inner end thereof to a position adjacent the flange 145, therefore, downward movement of the pressure bar 19 has no effect on that particular punch 21.

From FIG. 4 of the drawings, it may be seen that the punches 21 each have a portion thereof cut away defining a notch 161 and the flange 147 is provided with an aperture 163 for each punch 21. The aperture 163 is smaller than the overall width of the punch 21 so that the flange 147 engages the upper edge of the notch 163 for returning the punch 21 to the stock loading 21 SL position, i.e., as the flange 147 is carried upwardly by the pressure bar 19 in a manner previously described.

From FIG. 3 of the drawings, it may be seen that the punch 11 includes resilient means 165 disposed adjacent the disengage pins 137 for providing resistance of movement of the pins 137 between the punch engage and the punch disengage position. More specifically, the resilient means 165 has a tapered shape thereto which is directed towards the pin 137. The resilient means 165 is fixedly attached to the flange 155 as with adhesives (not shown).

The resilient means 165 includes a high density skin surface 167 fixedly attached thereto as with adhesives (not shown) and formed from very thin flexible copper or the like. The skin surface 167 is deformable when engaged by the ridge 159 when moving the pin 137 between the punch engage and the punch disengage position. Therefore, the resilient means 165 coacting with the ridge 159 provides resistance of movement of the pin 137 between the punch engage and the punch disengage positions.

More specifically, the pins 137 respectively have overcenter type of movement whereby moving any one of them to the previously described punch engage position or the punch disengage position causes the ridge 159 thereof to come to rest at a place where it is not pressing against the resilient means 165, i.e., the resilient means 165 is relaxed when the pin is in either of the just mentioned positions. In this regard, it should be understood that the resilient means 165 may be formed from one continuous member extending from the first pin 137 to the last or the means 165 may constitute a plurality of separate members, e.g., one member for each pin 137.

Figure 1:
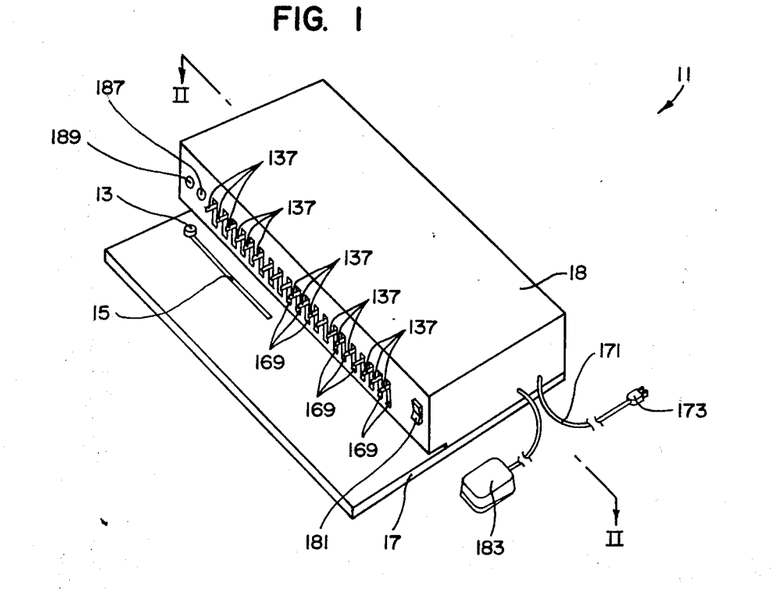
FIG. 1 is a perspective view of the machine of the present invention.

From FIGS. 1, 2, and 3 of the drawings, it may be seen that the cabinet structure 18 is provided with an elongated aperture 169 for each of the disengage pins 137. Therefore, the disengage pins are free to travel along a vertical axis within the limits of their respective apertures 169, i.e., as the pressure bar is moved up and down as previously disclosed.

Particular attention is now directed toward FIG. 7 of the drawings wherein it may be seen that the gang punch 11 includes a network of electronic structure 170 yet to be disclosed. The gang punch 11 includes a power cable 171 having one of the end thereof suitably attached to the gang punch 11 in a manner as schematically depicted in FIG. 7 of the drawings and having the other end thereof attached to a plug 173. The plug 173 preferably is mated with any convenient 115 volt AC outlet. However, it will be obvious to those skilled in the art that a transformer (not shown) may suitably be incorporated with the gang punch 11 to enable the plug 173 to be connected to other voltages, e.g., 220 volts AC or the like. Another alternative which may be adopted to enable the punch 11 to operate from other voltages would be to vary the operable parameters of the electrical structure herein disclosed in a manner well known to those skilled in the art.

In addition to the previously disclosed motor 31, clutch coil 87, and brake coil 113, the electrical structure 170 of the gang punch 11 includes a plug in module 175, a cam-actuated single pole double throw microswitch 177 (also shown in FIGS. 2 and 3), a manually operated single pole double throw toggle or jog switch 179, a manually operated triple pole double throw selector switch 181 having a midposition or an off position thereto (also shown in FIG. 1). A manually operated single pole single throw foot switch 183 (also shown in FIG. 1), a stock or paper actuated single pole single throw miniature microswitch 185 (also shown in FIG. 3), a single lamp 187 which is illuminated when the gang punch 11 is properly set so as to be manually actuated by the foot switch 183, and a single lamp 189 which is illuminated only when the gang punch 11 is properly set to be automatically actuated by paper, i.e., through the miniature microswitch 185.

Preparation to describing the schematic as depicted in FIG. 7 of the drawings, it should be pointed out that the switch 177 includes a common contact 191 and a pair of contacts 193, 195. The switch 177 is spring-loaded so that the contacts 191, 193 are closed when no outside force is acted thereon. However, the arm 27 engages the switch 177 when moved upward. This opens the contacts 191, 193 and closes the contacts 191, 195.

Additionally, the switch 179 includes a common contact 197, an off contact 198, and a pair of contacts 199, 201. The contacts 197, 199 are normally closed, i.e., closing contacts 197, 201 is a maintenance task for jogging the movement of the arms 27, 29 in a manner which will be more fully disclosed later in the specification.

Further, the first pole 202 of the switch 181 includes a common contact 203, an off contact 205, and a pair of contacts 207, 209. The second pole w11 of the selector switch 181 includes a common contact 213, an off contact 215, and a pair of contacts 217, 219. The third pole 221 of the selector switch 181 includes a common contact 223, an off contact 225, and a pair of contacts 227, 229.

Additionally, the miniature microswitch 185 (FIG. 3) is actuated automatically, i.e., placing the paper beneath the punches 21 causes engagement thereof with the punch block 25 and simultaneously trips the switch 185 to the closed position. Finally, switch 183 is intended to be depressed by the operator's foot, accordingly, depressing the switch 183 is effective to close the contacts thereof.

The solid state module 175 includes a full wave rectifier circuit 231 having the diodes 233 and a 0.005 mfd. capacitor 235 arranged substantially as depicted in FIG. 7 of the drawiings. In other words, the output from the rectifier 231 is a DC voltage having a negative terminal 237 and a positive terminal 239. Additionally, a silicon controlled rectifier (commonly known as an SCR) 241 is included in the module 175 having an anode 243, a cathode 245, and a gate 247. The SCR 241 is arranged in the schematic as depicted in FIG. 7 of the drawings. Additionally, an RC timing circuit comprising a 0.005 mfd capacitor 249 and a 470 K ohm resistor 251 are provided and arranged in the schematic as shown in FIG. 7 of the drawings. A diode 253 is provided and arranged in parallel with the brake coil 113 to provide a current bleed path for the EMF generated by the collapsing field. Additionally, a diode 255 and a 15 ohm resistor 257 are provided and are in series one with the other and are arranged in parallel with the clutch coil 87, i.e., through the contacts 197, 199 of the jog switch 179, to provide a current bleed path for EMF generated by the collapsing field of the clutch coil 87. Further, a 0.005 mfd filter capacitor 259 is provided and arranged in the schematic as depicted in FIG. 7 of the drawings. In addition, a silicon controlled rectifier or SCR 261 is included in the module 175 having an anode 263, a cathode 265, and a gate 267 and arranged in the schematic as depicted in FIG. 7 of the drawings. Further, a 100 ohm resistor 269 is included and arranged in the schematic between the negative terminal 237 and the gate 267. Additionally, an RC timing network is provided which includes a 2 mfd capacitor 271 in series with 47 K ohm resistor 273. The capacitor 271 and the resistor 273 are in series with the clutch coil 87, i.e., through the normally closed contacts 197, 199 of the jog switch 179. Finally, a 1 K ohm resistor 275 is interposed between the junction of the capacitor 271 and the resistor 273 and the common terminal 203 of the selector switch 181. The values as just stated for the various resistors and capacitors are intended for illustrative purposes only as I do not desire to be limited to any specified values. In other words, it will be obvious to those skilled in the art that other values mmay be selected for these components that are equally effective for the purpose herein disclosed. Therefore, these variations are intended to be within the spirit and scope of the present disclosure.

The selector switch 181 may be placed in the off position, thereby to close the contacts 203, 205; 213, 215; and 223, 225. Additionally the selector switch 181 may be placed in an automatic position, thus enabling the miniature microswitch 185 to drive the punches 21 through a previously described cycle thereof, in which case the contacts 203, 207; 213, 217; and 223, 227 are closed. Further, the selector switch 181 may be placed in a manual or foot position, thus enabling the punches 21 to be responsive to the foot switch 183 and to cause the punches to be carried through the previously described cycle thereof, in which case the contacts 203, 209; 213, 219; and 223, 229 are closed. It should now be apparent that when the switch 181 is placed in either the automatic or manual position, the second pole 211 thereof completes the circuit to the motor 31 and simultaneously a DC voltage is available from the terminals 237, 239. Additionally, placing the selector switch 181 in the automatic position causes the pole 221 thereof to complete the circuit for the signal lamp 189 and placing the switch 181 in the manual or foot position illuminates the signal lamp 187.

The preferred sequence of operation is as follows: Placing the switch 181 in the automatic position energizes the motor 31 which causes the pulley member 93 to rotate about the hub member 97 in a manner previously described. At the same time, the RC network including the capacitor 249 and the resistor 251, being in series with the clutch coil 87, starts to charge which places a positive voltage on the gate 247 of the SCR 241. Accordingly, the SCR 241 is gated into conduction. Therefore, the brake coil 113 is energized, which holds the armature plate 123 firmly against the stationary coil 113, thus preventing rotation of the shaft 61.

The RC network, including the capacitor 271 and the resistor 273, are also in series with the clutch coil 87, i.e., through the closed contacts 197, 199 of the switch 179. Accordingly, a path for current to charge the capacitor 271 is provided. Placing a stack of paper or the like beneath the punches 21 actuates or closes the switch 185 in a manner as previously described. This places a positive voltage on the gate 267 of the SCR 261, i.e., from the capacitor 271 through the resistor 275, thence through the closed contacts 203, 207 of the pole 202, thence through the closed switch 185 to the gate 67. Accordingly, the SCR 261 is gated into conduction, thus simultaneously energizing the clutch coil 87 and de-energizing the brake coil 113.

More specifically, current passes through the SCR 261, thence through the closed contacts 191, 195 of the cam actuated switch 177, thence upwardly to a common point 277, thence to the right and downwardly to the closed contacts 197, 199 of the jog switch 179, thence to a common point 279, thence through the clutch coil 87. From the just mentioned circuit tracing, it can readily be seen that the common point 279 is at the same potential as the negative terminal 237. Therefore, the capacitor 249 discharges through the resistor 251, thus removing the positive voltage on the gate 247 of the SCR 241 to cause the SCR 241 to cease conduction or to de-energize the brake coil 113. It should be understood that the values selected for the capacitor 249 and the resistor 251 will vary the time required to remove the positive voltage from the gate 247 as above disclosed. Therefore, it should be understood that the resistor 251 and/or the capacitor 249 may be considerably smaller than the values stated. In fact, it may be desirable to delete the resistor 251 so as to instantaneously remove the positive voltage on the gate 247, which is within the spirit and scope of this disclosure.

It can readily be appreciated that energizing the clutch coil 87 and de-energizing the brake coil 13 causes rotation of the shaft 61, i.e., driving the punches 21 through one cycle as previously disclosed. In this regard, it should be pointed out that the cam-actuated switch 177 is actuated so as to open the contacts 191, 195 and close the contacts 191, 193 subsequent to completing a predetermined portion of the cycle, e.g., 90°. This automatic actuation of the switch 177 at this time effects no changes since the common point 279 is still at the same potential as is the negative terminal 237, i.e., the SCR 261 being bypassed for reasons yet to be disclosed.

It should be understood that actuating the switch 177 subsequent to 90° of the cycle will cause the switch 177 to be actuated again subsequent to 270° of the cycle. Therefore, during the time in which the contacts 191, 193 are holding the clutch coil 87 energized, the capacitor 271 is being discharged, i.e., through the resistor 275, the contacts 203, 207 of the pole 202, the closed switch 185, and the resistor 269. This removes the positive voltage on the gate 267 of the SCR 261. Therefore, subsequent closing of the contacts 191, 195 will now de-energize the clutch coil 87 since the SCR 261 will no longer conduct. At the same time, closing contacts 191, 195 of the switch 177 removes the negative potential at the common point 279, therefore, the capacitor 249 is again charged so as to place a positive voltage on the gate 247 of the SCR 241 which energizes the brake coil 113 at a precise moment which causes the shaft 61 to cease rotation so as to stop the punches 21 precisely at the stock loading position 21 SL as above described. Holding the switch 185 closed after the punches are in the position 21 SL will prevent the capacitor 271 from being charged sufficiently to cause conduction of the SCR 261. In other words, momentarily opening the switch 185 after one cycle will re-establish the above disclosed parameter for allowing a subsequent cycle, etc.

Placing the selector switch 181 in the previously described manual or foot position closes the contacts 223, 229 for illuminating the signal lamp 187, closes the contacts 213, 219 for causing the motor 31 to be energized and also energizing the full wave rectifier 231, and closes the contacts 203, 209 which places the foot switch 183 in the same arrangement electrically as was the miniature microswitch 185, i.e., the switch 183 being parallel with the switch 185. Therefore, closing the switch 183 now has the same effect as above disclosed for closing the switch 185.

From the above disclosure, it will be appreciated that it is virtually impossible to jam the gang punch 11. However, since it is conceivable that it could jam or for some other reason the punches 21 are stopped at a position prior to completing their cycle, the jog switch 179 is provided. More specifically, the jog switch 179 has an on position wherein the contacts 197, 199 are closed, a jog position wherein the contacts 197, 201 are closed, or an off position wherein the contacts 197, 198 are closed. The switch 179 may be left in the on position or the off position, but is preferably biased from the jog position or toward the off position. Thereby, intermittent placement thereof is facilitated in the jog position. It can readily be seen from FIG. 7 of the drawings that placing the switch 179 in the jog position places the common point 197 at the same potential as is the negative terminal 237, i.e., bypassing the SCR 261. Therefore, when the switch 179 is in the jog position the clutch coil 87 is energized and the brake coil is de-energized in the same manner as above disclosed. Intermittent operation of the switch 179 to the jog position instantaneously dissipates the kinetic energy stored in the flywheel 83, thus causing the punches 21 to be carried through the stock piercing position 21 SP for completing a fraction of the cycle with each intermittent closing thereof, i.e., in the event the punches 21 were jammed. Also in this manner, the punches 21 may be precisely repositioned to the above-disclosed stock loading position 21 SL prior to returning the switch 179 to the on position.

Although the invention has been described and illustrated with respect to a preferred embodiment thereof, it is to be understood that it is not to be so limited since changes and modifications may be made therein which are within the full intended scope and spirit of the invention.

I claim:

1. A gang punch comprising a base, a pressure bar, means for slidably supporting said pressure bar a distance above said base to guidingly constrain the movement thereof along a vertical plane, a plurality of punch and coacting die means arranged in a row and attached to said base, said punch means having stock loading and stock piercing positions thereto, downward movement of said pressure bar being effective to drive the lower portions of selected ones of said punch means into said die means to said stock piercing position and upward movement of said pressure bar being effective to carry said selected ones of said plurality of punch means to said stock loading position to constitute one complete cycle thereof, lever arm means, lever arm support means attached to said base, means for pivotally attaching said lever arm means to said lever arm support means, means for coupling one end of said lever arm means to said pressure bar, power drive means including clutch means operably coupled to said lever arm means for causing reciprocating movement thereof, switching means for selectively causing said clutch means to be engaged, said means for coupling one end of said lever arm means to said pressure bar including shaft means, said one end of said lever arm means being provided with a bore for slidably receiving said shaft means, said bore extending substantially parallel with the longitudinal axis of said arm means and said shaft means protruding outwardly from said one end of said arm means towards said pressure bar, spring means for urging said shaft means towards said pressure bar, and ball means attached to the protruding end of said shaft means, said pressure bar being provided with a socket for receiving said ball means.

2. A gang punch comprising a base, a pressure bar, means for slidably supporting said pressure bar a distance above said base to guidingly constrain the movement thereof along a vertical plane, a plurality of punch and coacting die means arranged in a row and attached to said base, said punch means having stock loading and stock piercing positions thereto, downward movement of said pressure bar being effective to drive the lower portions of selected ones of said punch means into said die means to said stock piercing position and upward movement of said pressure bar being effective to carry said selected ones of said plurality of punch means to said stock loading position to constitute one complete cycle thereof, lever arm means, lever arm support means attached to said base, means for pivotally attaching said lever arm means to said lever arm support means, power drive means including clutch means operably coupled to said lever arm means for causing reciprocating movement thereof and for causing the outer ends of said lever arm means to establish a circular generatrix, means for coupling one end of said lever arm means to said pressure bar and for causing the reciprocating movement of said lever arm means to move said pressure bar along the vertical plane, said power drive means including an electrically powered motor, flywheel means for temporarily storing the kinetic energy from said motor for subsequent instantaneous dissipation thereof, said flywheel means being rotatably driven by said motor, and switching means for selectively causing said clutch means to be engaged.

3. A gang punch comprising a base, a pressure bar, means for slidably supporting said pressure bar a distance above said base to guidingly constrain the movement thereof along a vertical plane, a plurality of punch and coacting die means arranged in a row and attached to said base, said punch means having stock loading and stock piercing positions thereto, downward movement of said pressure bar being effective to drive the lower portions of selected ones of said punch means into said die means to said stock piercing position and upward movement of said pressure bar being effective to carry said selected ones of said plurality of punch means to said stock loading position to constitute one complete cycle thereof, lever arm means, lever arm support means attached to said base, means for pivotally attaching said lever arm means to said lever arm support means, power drive means including clutch means operably coupled to said lever arm means for causing reciprocating movement thereof and for causing the outer ends of said lever arm means to establish a circular generatrix, means for coupling one end of said lever arm means to said pressure bar and for causing the reciprocating movement of said lever arm means to move said pressure bar along the vertical plane, switching means for selectively causing said clutch means to be engaged, and means for selectively holding said punch means in said stock holding position.

4. The punch of claim 3 in which said means for selectively holding said punch means in said stock loading position includes electromagnetic brake means and said switching means includes first solid state silicon controlled rectifying switching means for selectively causing said electromagnetic brake means to be energized.

5. The punch of claim 4 in which said clutch means includes electromagnetic means for engaging and disengaging said clutch means.

6. The punch of claim 5 in which said switching means includes second solid state silicon controlled rectifying switching means for selectively causing said electromagnetic clutch means to be energized.

7. The punch of claim 6 in which said switching means includes electric means for causing said electromagnetic clutch means to be energized for a predetermined time interval and for simultaneously causing said electromagnetic brake means to be de-energized.

8. The punch of claim 7 in which is included foot operated switch means for manually triggering said silicon controlled rectifier switching means, said electric means being selectively responsive to said foot operated means to carry said punch means through said cycle thereof.

9. The punch of claim 8 in which is included automatic switch means for automatically triggering said silicon controlled rectifier switching means when stock is properly positioned between said punch and coacting die means, said electric means being selectively responsive to said automatic switch means to carry said punch means through said cycle thereof.

10. The punch of claim 9 in which is included jog switch means for selectively bypassing said silicon controlled rectifier means to energize said electro-magnetic clutch means and de-energizing said electromagnetic brake means, said clutch and brake means being selectively responsive to said jog switch means to allow continuous movement of said punch means or to allow fractional movement of said cycle thereof.

11. A gang punch comprising a base, a pressure bar, means for slidably supporting said pressure bar a distance above said base to guidingly constrain the movement thereof along a vertical plane, a plurality of punch and coacting die means arranged in a row and attached to said base, said punch means having stock loading and stock piercing positions thereto, downward movement of said pressure bar being effective to drive the lower portions of selected ones of said punch means into said die means to said stock piercing position and upward movement of said pressure bar being effective to carry said selected ones of said plurality of punch means to said stock loading position to constitute one complete cycle thereof, lever arm means, lever arm support means attached to said base, means for pivotally attaching said lever arm means to said lever arm support means, power drive means including clutch means operably coupled to said lever arm means for causing reciprocating movement thereof and for causing the outer ends of said lever arm means to establish a circular generatrix, means for coupling one end of said lever arm means to said pressure bar and for causing the reciprocating movement of said lever arm means to move said pressure bar along the vertical plane, switching means for selectively causing said clutch means to be engaged, a plurality of disengaging pin means for selectively engaging and disengaging any number of said punch means, said pin means respectively having punch engage and punch disengage positions thereof and being slidably attached to said pressure bar, and resilient means disposed adjacent said pin means for providing resistance of movement of said pin means between said punch engage and said punch disengage positions.

12. A gang punch comprising a base, a pressure bar, means for slidably supporting said pressure bar a distance above said base to guidingly constrain the movement thereof along a vertical plane, a plurality of punch and coacting die means arranged in a row and attached to said base, said punch means having stock loading and stock piercing positions thereto, downward movement of said pressure bar being effective to drive the lower portions of selected ones of said punch means into said die means to said stock piercing position and upward movement of said pressure bar being effective to carry said selected ones of said plurality of punch means to said stock loading position to constitute one complete cycle thereof, lever arm means, lever arm support means attached to said base, means for pivotally attaching said lever arm means to said lever arm support means, means for coupling one end of said lever arm means to said pressure bar, power drive means including clutch means operably coupled to said lever arm means for causing reciprocating movement thereof, switching means for selectively causing said clutch means to be engaged, a plurality of disengaging pin means for selectively engaging and disengaging any number of said punch means, said pin means respectively having punch engage and punch disengage positions thereto and being slidably attached to said pressure bar, resilient means disposed adjacent said pin means for providing resistance of movement of said pin means between said punch engage and said punch disengage positions, said plurality of pin means respectively including enlarged ridge portions intermediate the ends thereof, said resilient means including tapered portions thereto which are directed toward said plurality of pin means, said tapered portions respectively including flexible high density skin surfaces which are deformable when engaged by said ridge portions of said pin means when moving said pin means between said punch engage and punch disengage positions.

13. The punch of claim 2 in which said ball means attached to said shaft means consists of teflon plastic.

14. A gang punch comprising a base, a pressure bar, means for slidably supporting said pressure bar a distance above said base to guidingly constrain the movement thereof along a vertical plane, a plurality of punch and coacting die means arranged in a row and attached to said base, said punch means having stock loading and stock piercing positions thereto, downward movement of said pressure bar being effective to drive the lower portions of selected ones of said punch means into said die means to said stock piercing position and upward movement of said pressure bar being effective to carry said selected ones of said plurality of punch means to said stock loading position to constitute one complete cycle thereof, lever arm means, lever support means attached to said base, means for pivotally attaching said lever arm means to said lever support means, shaft means having inner and outer ends thereto, one end of said lever arm means being provided with a bore for slidably receiving said inner end of said shaft means, said bore extending substantially parallel with the longitudinal axis of said arm means and said outer end of said shaft means protruding outwardly therefrom towards said pressure bar, compression spring means received in said bore with one end thereof resting against the bottom of said bore and the opposite end thereof engaging said inner end of said shaft means for urging said shaft means towards said pressure bar, ball means attached to said outer end of said shaft means, said pressure bar being provided with a socket for receiving said ball means, means for selectively precluding inadvertent movement of said punch means, motor means, flywheel means for temporarily storing the kinetic energy from said motor, said flywheel means being rotatably driven by said motor, clutch means for operably coupling said flywheel means to the other end of said lever arm means for instantaneous dissipation of the kinetic energy stored therein to cause said punch means to be carried through said cycle with optimum force, and switching means for selectively causing said clutch means to be engaged for a predetermined time interval.

15. The punch of claim 14 in which is included a plurality of disengaging pin means for selectively engaging and disengaging any number of said punch means; said pin means respectively having punch engage and punch disengage positions thereto, being slidably attached to said pressure bar, and having enlarged ridge portions intermediate the ends thereof; and resilient means disposed adjacent said pin means for providing resistance of movement of said pin means between said punch engage and said punch disengage positions, said resilient means having tapered portions thereto which are directed toward said plurality of pin means, said tapered portions having flexible high density skin surface structure thereto, and said skin surface being deformable when engaged by said ridge portions of said pin means when moving said pin means between said punch engage and said punch disengage positions.

* * * * *